United States Patent [19]

Kobayashi et al.

[11] Patent Number: 4,740,436
[45] Date of Patent: Apr. 26, 1988

[54] SECONDARY BATTERY

[75] Inventors: Yukio Kobayashi, Sagamihara; Toshikazu Shishikura; Hiroshi Konuma, both of Yokohama; Toshiyuki Sakai, Kawasaki; Hidenori Nakamura, Kawasaki; Masataka Takeuchi, Kawasaki, all of Japan

[73] Assignees: Showa Denko Kabushiki Kaisha; Hitachi, Ltd., both of Tokyo, Japan

[21] Appl. No.: 882,009

[22] Filed: Jul. 3, 1986

[30] Foreign Application Priority Data

Jul. 5, 1985 [JP] Japan .................................. 60-146766
Jul. 5, 1985 [JP] Japan .................................. 60-146768
Aug. 19, 1985 [JP] Japan .................................. 60-180472
Mar. 19, 1986 [JP] Japan .................................. 61-59542

[51] Int. Cl.⁴ ............................................. H01M 4/60
[52] U.S. Cl. ................................. 429/194; 429/213
[58] Field of Search ............................ 429/213, 194

[56] References Cited

U.S. PATENT DOCUMENTS 4,321,114 3/1982 MacDiarmid et al. ............. 429/213
4,629,540 12/1986 Geniees et al. ..................... 429/213

FOREIGN PATENT DOCUMENTS 1216549 12/1970 United Kingdom ................ 429/213

OTHER PUBLICATIONS

Jozefowicz, Conductivity of High Polymer Compounds in the Solid State, Fast Ion Transport in Solids, Proceedings of the NATO sponsored Advanced Study Institute, Belgirate, Italy, Sep. 5-15, 1972.
Kitani et al, Study (II) on Organic Polymer Formed by Electrolytic Process-Secondary Battery Using Polyaniline, Lectures at 50th General Meeting of Electrochemical Association, Japan 1983, p. 123.

Primary Examiner—Donald L. Walton
Attorney, Agent, or Firm—Sughrue, Mion, Zinn, Macpeak, and Seas

[57] ABSTRACT

Disclosed is a non-aqueous secondary battery having a positive electrode composed of a polymer of aniline or an aniline derivative and a negative electrode composed of (i) and alkali metal, (ii) an alkali metal alloy, (iii) an electroconductive polymer or (iv) an alkali metal or alkali metal alloy/electroconductive polymer composite, wherein the polymer of aniline or an aniline derivative is formed by converting a doped polymer obtained by oxidative polymerization to an undoped state.

10 Claims, 1 Drawing Sheet

SECONDARY BATTERY

BACKGROUND OF THE INVENTION

1. Field of the Invention

The present invention relates to a high-performance non-aqueous secondary battery which has a high energy density, a good reversibility between charging and discharging, a very low self-discharge ratio and an excellent thermal stability.

2. Description of the Related Art

A so-called polymer battery comprising an electrode composed of a polymeric compound having a conjugated double bond in the main chain is regarded as a secondary battery having a high energy density. Various reports concerning secondary batteries have been published, for example, by P. J. Nigrey et al, J. Chem. Soc. Chem. Commun., 1979, 594, J. Electrochem. Soc., 1981, 1651, and Japanese Unexamined Patent Publications No. 56-136,469, No. 57-121,168, No. 59-3,870, No. 59-3,872, No. 59-3,873, No. 59-196,566, No. 59-196,573, No. 59-203,368 and No. 59-203,369.

The use of polyaniline obtained by electrolytic oxidative polymerization of aniline, which is a kind of conjugated polymer, as an electrode of an aqueous solution type or non-aqueous solvent type battery has already been proposed [A. G. MacDiarmid et al, Polymer Preprints, 25, NO. 2, 248 (1984), Sasaki et al, Lectures at 50th General Meeting of Electrochemical Association, 123 (1983) and Sasaki et al, Lectures at 51st General Meeting of Electrochemical Association, 228 (1984)].

A polymer of aniline or an aniline derivative is generally prepared by electrochemical polymerization or chemical polymerization. In each case, since polymerization is carried out by oxidative reaction, the process is called an "oxidative polymerization process", and a polymer of aniline or an aniline derivative obtained according to this process is protonated by a protonic acid. Moreover, the polymer is obtained in the state doped with dopant in an amount of several to scores of mole % based on the repeating units.

In order to use a polymer of aniline or an aniline derivative obtained according to this process as an active electrode material, the obtained polymer is dried under a reduced pressure, the polymer is washed with water to remove impurities and then dried under a reduced pressure, or the polymer is washed with an organic solvent. These methods can be used in combination.

In a non-aqueous secondary battery in which a polymer of aniline or an aniline derivative prepared by the above-mentioned oxidative polymerization process and treated by the above-mentioned method is used as the positive electrode and an alkali metal, an alkali metal alloy, an electroconductive polymer, an electroconductive polymer composite is used as the negative electrode, a good battery performance such as a low self-discharge ratio or a high energy density is difficult to obtain, and the characteristics of this secondary battery cannot be regarded as epoch-making and excellent over those of a known nickel/cadmium battery or lead battery.

SUMMARY OF THE INVENTION

It is a primary object of the present invention to provide a high-performance non-aqueous secondary battery which has a very low self-discharge ratio, a large electric capacity, a good reversibility between charging and discharging, a high energy density and an excellent thermal stability.

In accordance with the present invention, there is provided a non-aqueous secondary battery comprising a positive electrode composed of a polymer of aniline or an aniline derivative and a negative electrode composed of an alkali metal, an alkali metal alloy, an electroconductive polymer or an alkali metal or alkali metal alloy/electroconductive polymer composite, wherein the polymer or aniline or an aniline derivative is formed by converting a doped polymer obtained by oxidative polymerization to an undoped state.

DESCRIPTION OF THE PREFERRED EMBODIMENTS

The polymer of aniline or an aniline derivative used as the positive electrode of the secondary battery of the present invention is obtained by oxidative polymerization of a compound represented by the following general formula (1) or (2), and the polymer may be a homopolymer or a copolymer:

(1)

or (2)

wherein $R_1$ through $R_6$ independently represent a hydrogen atom or an alkyl group or alkoxy group having 1 to 5 carbon atoms, and X and Y independently represent a hydrogen atom or a phenyl group.

As typical examples of the aniline compounds represented by the general formulae (1) and (2), there can be mentioned aniline, 2-methylaniline, 2,5-dimethylaniline, 2-methoxyaniline, 2,5-dimethoxyaniline, o-phenylene-diamine, 3-methyl-1,2-diaminobenzene, diphenylamine and triphenylamine. Of these aniline compounds represented by the general formulae (1) and (2), aniline, o-phenylene-diamine and triphenylamine are preferred and aniline is especially preferred. The copolymer comprises at least 50 mole % of units derived from the compound represented by the general formula (1) or (2). As the comonomer, there can be mentioned benzene, thiophene and pyrrole.

The polymer of the aniline compound can be prepared according to either the electrochemical oxidative polymerization process or the chemical oxidative polymerization process.

An example of the electrochemical polymerization process is disclosed in Journal of Japanese Chemical Society, No. 11, page 1801 (1984). According to the electrochemical oxidative polymerization process, polymerization of aniline or its derivative is accomplished by anodic oxidation. For this anodic oxidation, a current density of about 0.01 to about 50 mA/cm$^2$, preferably 2 to 20 mA/cm$^2$, and an electric field voltage of 1 to 300V, preferably 10 to 300V, are adopted. The polymerization is carried out in the presence of an auxiliary liquid in which aniline or its derivative is soluble. Water or a polar organic solvent can be used. When a water-miscible solvent is used, a small amount of water may be incorporated. As the solvent giving good results, there can be mentioned alcohols, ethers (such as dioxane and tetrahydrofuran), acetone, acetonirile, dimethylformamide and N-methlpyrrolidone.

The polymerization is carried out in the presence of a complexing agent. By the complexing agent is meant a salt having as an anion a group $BF_4^-$, $AsF_4^-$, $AsF_6^-$, $SbF_6^-$, $SbCl_6^-$, $PF_6^-$, $ClO_4^-$, $HSO_4^-$, $SO_4^{2-}$ $Cl^-$, $Br^-$ or $F^-$. The obtained polyaniline compound is in the state doped with the corresponding anion (complex compound).

The salt contains as a cation, a proton, a quaternary ammonium cation, a lithium cation, a sodium cation or a potassium cation.

An example of the chemical polymerization process is disclosed in A. G. Green and A. E. Woodhead, J. Chem. Soc., 2388 (1910). According to the chemical polymerization process, oxidative polymerization is accomplished by an oxidative strong acid or a combination of a strong acid and an inorganic oxidant in an aqueous solution containing aniline or its derivative. The polymer obtained according to this polymerization (oxidation polymer) can be in the form of powder. Accordingly, the obtained powdery polymer may be separated and then dried before use. Also in this process, since an anion is present, the polyaniline compound is in the state doped with the corresponding anion (complex compound).

The inorganic oxidant used in the chemical oxidative polymerization process is not particularly critical, so long as the inorganic oxidant is soluble in an aqueous solution of a strong acid. As typical instances, there can be mentioned ammonium persulfate, potassium persulfate, hydrogen peroxide, an ammonium persulfate/Fe (II) ion redox system, a hydrogen peroxide/Fe (II) ion redox system, potassium dichromate, potassium permanganate and sodium chlorate. In order to obtain a secondary battery having a good battery performance, ammonium persulfate, an ammonium persulfate/Fe (II) ion redox system and a hydrogen peroxide/Fe (II) ion redox system are preferred.

In each of the polymerization processes, other additives such as carbon black, Teflon powder, polyethylene ethylene glycol and polyethylene can be incorporated in the polymerization electrolyte.

The doped polymer obtained by the oxidative polymerization is converted to an undoped state. As means for effecting this conversion, there can be mentioned the following methods (i), (ii) and (iii) and combinations thereof.

(i) The polymer is treated with an aqueous solution of an alkali.

(ii) The polymer is electrochemically reduced. (iii) The polymer is heat-treated at a temperature of 100° to 300° C.

The methods (i) and (iii), a combination of the methods (ii) and (i) and a combination of the methods (i) and (iii) are preferred; the method (i) and the combination of methods (i) and (iii) being especially preferred.

Each of these methods for converting the doped polymer to an undoped polymer will now be described.

First, the alkali treatment method (i) will be described. The polymer of aniline or an aniline derivative obtained according to the oxidative polymerization process is protonated by a protonic acid, and the polymer is often obtained in the state containing the electrolyte, oxidizing agent and additive in the polymerization liquid, impurities in the electrolytic solution, by-products formed by the polymerization and oligomers. By the alkali treatment, the polymer is converted to an undoped state and in addition, these impurities, by-products and the like can be removed.

As the alkali treatment method, there can be mentioned a method in which the polymer is washed several times with an aqueous solution of an alkali directly or after water washing, and a method in which alkali washing and water washing are alternately repeated several times and finally, the polymer is washed with water. Water washing is conducted until the pH value of the washing water is 5 to 9, preferably 6 to 8.

The kind of aqueous solution of the alkali is not particularly critical, so long as the pH value exceeds 12, but in order to increase the treatment efficiency, use of an aqueous solution having a higher pH value is preferred.

As the alkali species, either inorganic alkalis or organic alkalis can be used, so long as they are soluble in water. However, it is preferred that general-purpose alkali species be used. For example, there can be mentioned alkali metal hydroxides such as KOH and NaOH, alkaline earth metal hydroxides such as $Mg(OH)_2$ and $Ca(OH)_2$, ammonia and amines such as triethylamine and tributylamin. Aqueous solutions of KOH, NaOH and ammonia are preferred, and aqueous ammonia is especially preferred because the residual alkali or neutralization salt can be simply removed by the water washing treatment after the neutralization treatment and by the drying treatment of the polymer under reduced pressure.

The frequency of the alkali treatment of the polymer depends on the quantity or shape of the polymer to be treated, the polymer-preparing process, the concentration and quantity of the treating solution and the size and shape of the treatment vessel. However, washing is ordinarily conducted one time to several times.

At the alkali treatment of the polymer, a sufficient effect can be attained merely by immersing the polymer in an aqueous solution of an alkali, but in order to perform washing promptly and effectively, a method may be adopted in which in the state where an aqueous solution of an alkali is circulated or the polymer is immersed in the aqueous solution of the alkali, the entire system is stirred, and a method in which an external energy such as ultrasonic vibration is applied. The alkali treatment time depends on the quantity and shape of the polymer, the concentration and quantity of the treating solution and the size and shape of the treatment vessel as well as the frequency of the alkali treatment, and the alkali treatment time cannot be simply specified.

As the method for electrochemically reducing the polymer of aniline or an aniline derivative, if the polymer is obtained by the electrochemical polymerization process, there can be mentioned (1) a method in which the obtained polymer is electrochemically reduced as it is in the liquid used for the electrolytic polymerization, (2) a method in which the polymer is transferred into another electrolytic solution such as a neutral or acidic solution containing an ionic electroconductive electrolyte, for example, an aqueous solution or non-aqueous solution containing $HCl$, $HBF_4$, $HClO_4$, $HPF_6$, $KPF_6$, $LiBF_4$, $LiPF_6$, $LiAsF_6$, $LiClO_4$, $LiCl$, $KCl$, $NaCl$, $KPF_6$, $LiSO_3CF_3$, $NH_4ClO_4$, $Bu_4NClO_4$, $Bu_4NBF_4$ or $Me_4NPF_6$, where the polymer is electrochemically reduced, (3) a method in which the obtained polymer which is powdery or is separated from the polymerization substrate is molded into an electrode shape and is connected to an assembly molded into a collector and electrochemical reduction is carried out in an ionic electroconductive electrolytic solution, and (4) a method in which the polymer is not molded, a substrate of a collector is inserted in an electrolyte having a specific gravity smaller than the specific gravity of the polymer and the polymer is brought into contact with the substrate to effect electrochemical reduction.

For electrochemical reduction of the polymer of aniline or the aniline derivative obtained according to the chemical polymerization process, the methods (3) and (4) can be adopted among the above-mentioned methods for reducing the polymer obtained by the electrochemical polymerization process.

As the solvent of the electrolytic solution used for electrochemically reducing the polymer of aniline or the aniline derivative, water or a non-aqueous solvent can be used. For example, solvents specifically mentioned as the solvent of the electrolyte of the non-aqueous secondary battery of the present invention can be used.

The method for heat-treating the polymer to convert it to an undoped state will be described. The temperature for the heat treatment of the polymer is 100° to 300° C. If the heat treatment temperature is lower than 100° C., a secondary battery having a long cycle life and a low self-discharge ratio cannot be obtained. If the heat treatment temperature is higher than 300° C., the oxidation polymer of the aniline type compound is deteriorated to some extent and therefore, a secondary battery having a good performance is difficult to obtain.

The heat treatment can be carried out in air, but preferably the heat treatment is carried out in an atmosphere of an inert gas such as nitrogen or argon or especially in vacuo.

The heat treatment time depends on the kind of the oxidation polymer of the aniline type compound and the heat treatment temperature and cannot be simply specified, but preferably the heat treatment is conducted for 5 to 20 hours.

At least two of the above-mentioned methods (i), (ii) and (iii) for converting the polymer to an undoped state can be combined. As preferred examples of this combination, there can be mentioned a method in which the electrochemical reduction is carried out according to the method (ii) and the alkali treatment is then carried out according to the method (i), and a method in which the alkali treatment is carried out according to the method (i) and the heat treatment is then carried out according to the method (iii). The latter method is especially preferred.

It is preferred that the thus-obtained undoped polymer be complexed with a protonic acid. The undoped polymer can be directly complexed with a protonic acid. However, it is preferred that components soluble in the electrolyte used for the secondary battery of the present invention be removed before or after the polymer is complexed with a protonic acid. The method for removing components soluble in the electrolyte is not particularly critical. In general, however, there are used a method in which the polymer is washed with the electrolyte, a method in which the polymer is washed with an organic solvent, and an extraction method using an organic solvent.

In the washing method using the electrolyte or organic solvent, the presence or absence of stirring, the washing frequency and the washing time are not particularly critical, so long as washing can be effected to such an extent that the electrolyte or organic solvent is not colored. The washing temperature is in the range of from the solidification point of the organic solvent used for washing or the organic solvent in the electrolyte to the boiling point thereof.

As the extraction method using an organic solvent, there can be adopted a well-known Soxhlet extraction method. The extraction conditions are not particularly critical, if the extract is not colored. However, it is generally preferred that the extraction be carried out in an atmosphere of an inert gas such as nitrogen or argon.

The electrolyte used for washing the polymer is not particularly critical, and for example, an electrolyte used for the secondary battery of the present invention, described below, can be used.

The organic solvent used for washing or extraction of the polymer is not particularly critical, and any organic solvents capable of removing the components soluble in the electrolyte of the secondary battery of the present invention can be used. Namely, the organic solvent used for the electrolyte of the secondary battery of the present invention can be used for washing or extraction, or organic solvents having a solubility parameter close to that of the polyaniline compound, for example, carbonyl compounds such as acetone, nitrile compounds such as acetonitrile, chlorinated compounds such as dichloroethane, carboxylic acid compounds such as acetic acid and amide compounds such as dimethylformamide, may be used for washing or extraction.

The method for complexing the polymer with a protonic acid is not particularly critical, but a method is generally adopted in which the polymer is immersed or stirred in an acidic aqueous solution having a pH value smaller than 3.

As the anion of the protonic acid used for the complexing, there can be mentioned halogens such as $Cl^-$, $F^-$ and $Br^-$, halides of elements of the Group IIIa such as $BF_4^-$, halides of elements of the Group Va such as $PF_8^-$ and $AsF_6^-$, and $ClO_4^-$, $HSO_4^-$ and $SO_4^{2-}$. Among them, $Cl^-$, $BF_4^-$ and $ClO_4^-$ are preferred, and $BF_4^-$ is especially preferred. These anions may be the same as or different from the anion used for the electrolyte of the battery, but preferably the anion of the protonic acid used for the complexing be the same as the anion of the electrolyte of the battery.

The doped polymer to be converted to an undoped state or the undoped polymer to be complexed with a protonic acid may be powdery, granular or filmy, or the polymer may be molded in the form of an electrode.

The molded body that can be used as an electrode can be obtained according to various methods. For example, in the case of the powdery polymer, a molded body can be obtained by compression-molding the powder according to a known method. In many cases, a temperature ranging from room temperature to 300° C. and a pressure ranging from 10 to 10,000 kg/cm² are used.

The negative electtode used for the secondary battery of the present invention is composed of (i) an alkali metal, (ii) an alkali metal alloy, (iii) an electroconductive polymer or (iv) an alkali metal or alkali metal alloy/electroconductive polymer composite.

As the alkali metal (i), there can be mentioned Li, Na and K, and as the alkali metal alloy (ii), there can be mentioned an Li/Al alloy, an Li/Hg alloy, an Li/Zn alloy, an Li/Cd alloy, an Li/Sn alloy and an Li/Pb alloy, and alloys of at least three metals used for these alloys, inclusive of the alkali metal, such as Li/Al/Mg, Li/Al/Sn, Li/Al/Pb, Li/Al/Zn and Li/Al/Hg. These alloys can be prepared according to the electrochemical method or the chemical method, but an alloy prepared according to the electrochemical method is preferred. As the electroconductive polymer (iii), there can be mentioned polypyrrole, polypyrrole derivatives, polythiophene, polythiophene derivatives, polyquionoline, polyacene, poly-p-phenylene, poly-p-phenylene derivative and polyacetylene. As the alkali metal or alkali metal alloy/electroconductive polymer composite (iv), there can be mentioned a composite of an Li/Al alloy and an electroconductive polymer as mentioned above, such as poly-p-phenylene or polyacetylene. As preferred examples, there can be mentioned polyacetylene, poly-p-phenylene, an Li/Al alloy, an Li/Al/Mg alloy and a composite of an Li/Al alloy and poly-p-phenylene. By the composite referred to herein is meant a homogeneous mixture or laminate of an alkali metal or alkali metal alloy and an electroconductive polymer, or a modification product formed by modifying the component of the substrate with another component.

The polymer of aniline or the aniline derivative and the electroconductive polymer, which are used as the electrodes of the secondary battery of the present invention, may be mixed with an appropriate electroconductive material such as carbon black, acetylene black, a metal powder, a metal fiber or a carbon fiber, as is well-known to persons with ordinary skill in the art.

Furthermore, the electrodes may be reinforced with a thermoplastic resin such as polyethylene, modified polyethylene, polypropylene, poly(tetrafluoroethylene), an ethylene/propylene/diene terpolymer (EPDM) or sulfonated EPDM.

The supporting electrolyte of the electrolytic solution of the secondary battery of the present invention is an alkali metal salt. As the alkali metal of the alkali metal salt, there can be mentioned Li, Na and K, and Li is preferred.

As typical instances of the anion component of the supporting electrolyte, there can be mentioned $ClO_4^-$, $PF_6^-$, $AsF_6^-$, $AsF_4^-$, $SO_3CF_3^-$, $BF_4^-$ and $BR_4^-$ (R represents an alkyl group having 1 to 10 carbon atoms or aryl group having 6 to 10 carbon atoms).

As specific examples of the alkali metal salt as the supporting electrolyte, there can be mentioned $LiPF_6$, $LiSbF_6$, $LiClO_4$, $LiAsF_6$, $CF_3SO_3Li$, $LiBF_4$, $LiB(Bu)_4$, $LiB(Et)_2(Bu)_2$, $NaPF_6$, $NaBF_4$, $NaAsF_6$, $NaB(Bu)_4$, $KB(Bu)_4$ and $KAsF_6$, through the alkali metal salt is not limited to these compounds. These alkali metal salts may be used singly or in the form of mixture of two or more thereof.

The concentration of the alkali metal salt depends on the kind of the polymer used for the positive electrode, the kind of the negative electrode, the charging conditions, the operating temperature, the kind of the supporting electrolyte and the kind of the organic solvent, and the concentration cannot be simply specified. However, it is generally preferred that the concentration of the alkali metal salt be 0.5 to 10 moles per liter. The electrolytic solution may be homogeneous or heterogeneous.

As the organic solvents that can be used singly or in the form of a mixture as the solvent of the electrolytic solution of the secondary battery of the present invention, there can be mentioned:

alkylene nitriles such as crotononitrile (liquid at—51.1° to 120° C.), trialkyl borates such as trimethyl borate $(CH_3O)_3B$ (liquid at—29.3° to 67° C.), tetraalkyl silicates such as tetramethyl silicate $(CH_3O)_4Si$ (boiling at 121° C.), nitroalkanes such as nitromethane $CH_3NO_2$ (liquid at—17° to 100.8° C.), alkylnitriles such as acetonitrile $CH_3CN$ (liquid at—45° to 81.6° C.), dialkylamides such as dimethylformamide $HCON(CH_3)_2$ (liquid at—60.48° to 149° C.), lactams such as N-methylpyrrolidone (liquid at—16° to 202° C.), monocarboxylic acid esters such as ethyl acetate (liquid at—83.6° to 77.06° C.), ortho-esters such as trimethyl orthoformate $HC(OCH_3)_3$ (boiling at 103° C.), lactones such as γ-butyrolactone $CH_2—CH_2—CH_2—O—CO$ (liquid at—42° to 206° C.), dialkyl carbonates such as dimethyl carbonate $OC(OCH_3)_2$ (liquid at 2° to 90° C.), alkylene carbonates such as propylene carbonate (liquid at—48° to 242° C.), monoethers such as diethyl ether (liquid at—to 116° 34.5° C.), polyethers such as 1,1-dimethoxyethane (liquid at—113.2° to 64.5° C.) and 1,2-dimethoxyethane (liquid at—58° to 83° C.), cyclic ethers such as tetrahydrofuran (liquid at—65° to 67° C.) and 1,3-dioxolane (liquid at—95° to 78° C.), nitro aromatic hydrocarbons such as nitrobenzene (liquid at 5.7° to 210.8° C.), aromatic carboxylic acid halides such as benzoyl chloride (liquid at 0° to 197° C.) and benzoyl bromide (liquid at—24° to 218° C.), aromatic sulfonic acid halides such as benzene sulfonyl chloride (liquid at 14.5° to 251° C.), aromatic phosphonic acid dihalides such as benzene phosphonyl dichloride (boiling at 258° C.), aromatic thiophosphonic acid dihalides such as benzene thiophosphonyl dichloride (boiling at 124° C. under 5 mmHg), cyclic sulfones such as sulfolane (melting at 22° C.) and 3-methylsulfolane (melting at −1° C.), alkylsulfonic acid halides such as methanesulfonyl chloride (boiling at 161° C.), alkylcarboxylic acid halides such as acetyl chloride (liquid at —112° to 50.9° C.), acetyl bromide (liquid at—96° to 76° C.) and propionyl chloride (liquid at—94° to 80° C.), saturated heterocyclic compounds such as tetrahyothiophene (liquid at—96° to 121° C.) and 3-methyl-2-oxazolidone (melting at 15.9° C.), dialkylsulfamic acid halides such as dimethylsulfamyl chloride (boiling at 80° C. under 16 mmHg), alkyl halosulfonates such as ethyl chlorosulfonate (boiling at 151° C.), unsaturated heterocyclic carboxylic acid halides such as 2-furoyl chloride (liquid at—2° to 173° C.), 5-membered unsaturated heterocyclic compounds such as 1-methylpyrrole (boiling at 114° C.), 2,4-dimethylthiazole (boiling at 144° C.) and furane (liquid at—85.65°-31.36° C.), dibasic carboxylic acid esters and halides such as ethyl oxalyl chloride (boiling at 135° C.), mixed alkylsulfonic acid halide/carboxylic acid halide such as chlorosulfonyl acetyl chloride (boiling at 98° C. under 10 mmHg), dialkylsulfoxides such as dimethylsulfoxide (liquid at 18.4° to 189° C.), dialkyl sulfites such as dimethyl sulfite (liquid at—31.75° to 188.5° C.), dialkyl sulfates such as dimethyl sulfate (boiling at 126° C.), alkylene sulfites such as ethylene glycol sulfite (liquid at—11° to 173° C.), and halogenated alkanes such as methylene chloride (liquid at—95° to 40° C.) and 1,3-dichloropropane (liquid at—99.5° to 120.4° C.).

Among these organic solvents, there are preferably used sulfolane, crotononitrile, nitrobenzene, tetrahydrofuran, methyl-substituted tetrahydrofuran, 1,3-dioxolane, 3-methyl-2-oxazolidone, propylene carbonate, ethylene carbonate, γ-butyrolactone, ethylene glycol sulfite, dimethyl sulfite, dimethyl sulfoxide, 1,1-dimethoxyethane and 1,2-dimethoxyethane, and a mixed solvent of propylene carbonate and 1,2-dimethoxyethane and a mixed solvent of sulfolane and 1,2-dimethoxyethane are especially preferred because they are considered to be chemically most inactive to the battery components and they are liquid within a broad temperature range and because they make it possible to utilize the positive electrode substance most efficiently.

In the secondary battery of the present invention, the amount of the dopant to be doped in the polymer of aniline or the aniline derivative is 0.2 to 1.0 mole, preferably 0.2 to 0.8 mole, per nitrogen atom in the polymer.

The amount of the dopant doped can be freely controlled by measuring the quantity of coulomb flowing at the electrolysis. The doping can be carried out at a constant current or voltage or under conditions where the current and voltage vary.

In the present invention, a porous membrane of a synthetic resin such as polyethylene or polypropylene or a natural fiber paper may be used as a separator according to need.

Some of electrodes used for the secondary battery of the present invention react with oxygen or water to degrade the performance of the battery. Accordingly, it is preferred that the battery be closed to maintain a substantially oxygen-free and anhydrous state.

The non-aqueous secondary battery of the present invention is advantageous over the known Ni/Cd battery or lead battery in that the energy density is high, the reversibility between charging and discharging is good, the self-discharge ratio is very low and the performance characteristics are very good.

The non-aqueous secondary battery of the present invention is advantageous over the non-aqueous secondary battery comprising a positive electrode of the polymer of aniline or the aniline derivative not converted to an undoped state in that the self-discharge ratio is very low, the electric capacity is large and the energy density is high.

Moreover, since the secondary battery of the present invention has a light weight and a small size, the secondary battery of the present invention is very suitable as a battery for a portable device, an electric car or a gasoline car or as a power storage battery.

The present invention will now be described in detail with reference to the following examples and comparative examples.

EXAMPLE 1

(Preparation of Polyaniline)

In 100 cc of a 1N-$HBF_4$ aqueous solution containing aniline at a concentration of 0.2 mole/l, electrolytic polymerization was carried out at a constant current density of 1.0 mA/$cm^2$ on the surface of a platinum plate having a diameter of 15 mm and provided with a lead wire having a diameter of 0.5 mm. A platinum plate having the same diameter was used as the counter electrode and an Ag/AgCl electrode was used as the reference electrode.

When the quantity of coulomb for the electrolytic polymerization reached 20 C, the polymerization was stopped. On both the surfaces of the platinum plate, 9.5 mg of filmy polyaniline composed of deep-green fibrils entangled with one another was obtained. The average polymerization potential was 0.74V relative to the Ag-/AgCl reference electrode.

(Alkali Treatment of Polyaniline)

The filmy polyaniline obtained on the platinum plate by the electrolytic polymerization was immersed together with the platinum plate in distilled water for about 30 minutes, and the acid and the like included in the polymer were washed away. Then, the filmy polyaniline was immersed together with the platinum plate in aqueous ammonia having a concentration of 28% by weight for about 1 hour. During the immersion in aqueous ammonia, ultrasonic vibration was applied for about 1 minute. The filmy polyaniline was transferred together with the platinum plate into distilled water, and the above-mentioned operation was repeated two times. Finally, the filmy polyaniline was washed together with the platinum plate with distilled water for about 1 hour. The pH value of the washing water was 7.2. Then, the polyaniline was dried under a reduced pressure at 80° C. for 4 hours.

The weight of the dried polyaniline was 5.9 mg, and the polymer was violet in color.

(Construction of Experimental Cell)

Figure 1:
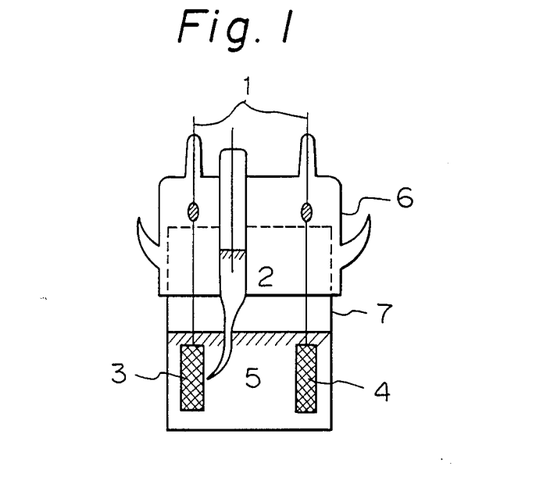
FIG. 1 is a schematic diagram illustrating a cross-section of an experimental glass cell for a sealed lid secondary battery according to one embodiment of the present invention.

An experimental cell 7 shown in FIG. 1 was constructed. The polyaniline obtained on the platinum plate by the above-mentioned procedures was used as the positive electrode 3 while using the platinum plate as a collector. A molded body formed by placing 100 mg of an alloy powder comprising Li and Al at an atomic ratio of 50/50 on a nickel net and compression-molding the powder at about 350° C. into a shape having a diameter of 15 mm was used as the negative electrode 4. A nickel line was taken out from a part of the nickel net to form a lead 1 of the negative electrode.

A solution of 1 mole/l of $LiBF_4$ in a mixed solvent comprising PC (propylene carbonate) and DME (1,2-dimethoxyethane) at a volume ratio of 1/1 was used as the electrolytic solution 5.

In the experimental cell shown in FIG. 1, reference numerals 2 and 6 represent a reference electrode and a sealing lid of glass, respectively.

(Battery Performance Test)

The assembled battery was discharged at a constant current density of 5 mA/cm$^2$ until the voltage was reduced to 2.0V, but very little electric current flowed. Then, the battery was immediately charged at the same current density until the battery voltage was elevated to 4.3V, and the above operation was repeated under the same conditions. When the operation was repeated 4 times, both the charge quantity and the discharge quantity became substantially constant, and the quantity of coulomb was 3.22 C. When calculation was made from this value, it was found that 51 mole % of the dopant based on the monomer units of the polyaniline as the positive electrode participated in charging and discharging.

When the above-mentioned charging-discharging operation was further repeated, the charging-discharging efficiency was almost 100%, and at the 200th cycle, the same quantity of coulomb as at the 4th cycle could be charged and discharged. After charging of the 201st cycle, the battery system was allowed to stand in an open circuit for 720 hours to evaluate the self-discharge property. The discharge quantity after the standing was 3.01 C, and the self-discharge ratio in about 1 month was 6.5%. At the 200th cycle, in this battery, the electric capacity density per weight of the positive electrode was 151 Ah/kg and the energy density was 450 Wh/kg.

COMPARATIVE EXAMPLE 1

(Treatment of Polyaniline)

Polyaniline obtained on a platinum plate by electrolytic polymerization in the same manner as described in Example 1 was immersed together with the platinum plate in distilled water for 1 hour, and ultrasonic washing was conducted for about 1 minute during the immersion. The distilled water used was mentioned washing was repeated three times. The pH value of the final washing water was 6.8.

Then, the polyaniline was dried under reduced pressure at 80° C. for 1 hour and was washed with distilled water again for 1 hour. The pH value of the washing water was 6.8 and was not different from the pH value of the washing water before the drying treatment.

Then, the polyaniline was dried under reduced pressure at 80° C. for 4 hours together with the platinum plate. The weight of the polyaniline after drying was 9.0 mg.

(Battery Performance Test)

The battery characteristics were examined under the same conditions as described in Example 1 by using the same electrolytic solution and experimental cell as used in Example 1.

The quantity of coulomb at the first discharging was different from that of Example 1 and 2.16 C. When the charging-discharging operation was repeated in the same manner as described in Example 1, at the 4th cycle the charging quantity and discharging quantity reached a substantially constant level and the value was 2.87 C.

When calculation was made based on the supposition that 7.0 mg obtained by subtracting the weight of the dopant $BF_4^-$ corresponding to the initial discharge quantity from 9.0 mg, that is, the weight of the polyaniline, was the net weight of the polyaniline, it was found that the above-mentioned quantity of electricity corresponded to a doping level of 39 mole %. When the charging-discharging operation was further repeated under the same conditions, the charging-discharging efficiency was almost 100%, and the charging-discharging quantity at the 200th cycle was 2.82 C.

When the self-discharge test was carried out for 720 hours at the 201st cycle, the discharging quantity after the standing was reduced to 2.19 C. The selfdischarge ratio in about one month was 22%.

At the 200th cycle, the electric capacitance density per weight of the positive electrode was 111 Ah/kg and the energy density was 332 Wh/kg.

EXAMPLE 2

(Preparation of Polyaniline)

To 100 cc of a 1N-HCl aqueous solution containing 0.22 mole/l of aniline, $(NH_4)_2S_2O_8$ was added in an amount corresponding to 0.25 mole/l with stirring by a magnetic stirrer to effect chemical polymerization of aniline. The obtained polyaniline was powdery.

(Alkali Treatment of Polyaniline)

The powdery polyaniline obtained according to the above-mentioned method was transferred into distilled water and washed with stirring for about 30 minutes. Then, the polyaniline was transferred into a 1N-KOH aqueous solution and washed with stirring for about 2 hours. Then, the polymer was washed with distilled water with stirring for 30 minutes, and the distilled water used was exchanged with fresh distilled water and washing was conducted again for 15 minutes. The pH value of the washing water was 8.5. The washed polyaniline was dried under reduced pressure at 80° C. for 4 hours.

(Battery Performance Test)

A solution of 1 mole/l of $LiBF_4$ in a mixed solvent comprising PC and DME at a volume ratio of 1/1 was used as the electrolytic solution as in Example 1. A disc having a diameter of 10 mm was obtained by placing a mixture of 10 mg of the obtained polyaniline and 1.5 mg of acetylene black on a platinum net and compression-molding the mixture, and set in the same cell as used in Example 1. The discharging was carried out at a low current density of 1.0 mA/cm$^2$ until the voltage became 2.0V, but a substantial quantity of electricity could not be obtained.

Figure 2:
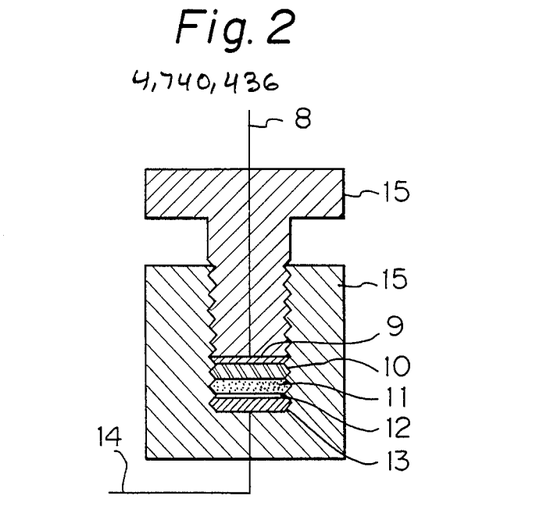
FIG. 2 is a schematic diagram illustrating a cross-section of a battery cell for measuring the characteristics of a secondary battery according to one embodiment of the present invention.

An experimental cell shown in FIG. 2 was constructed by using the compression-molded disc as the positive electrode. More specifically, the polyaniline/acetylene black mixture was used as a positive electrode 12 and the platinum net to which the mixture was pressed was used as a collector 13 for the positive electrode. A mixture of 15 mg of powdery poly-p-phenylene synthesized from dibromobenzene by using a Grignard reagent according to the process disclosed in T. Yamamoto and A. Yamamoto, Chem. Lett., 1977, 353 and 1.5 mg of acetylene black was used for a negative electrode 10. The mixture was placed on a nickel net as a collector 9 and molded into a disc having a diameter of 10 mm. A polypropylene diaphragm 11 impregnated with the electrolytic solution was interposed between the positive electrode 12 and the negative electrode 10. Leads 8 and 14 were attached to the obtained assembly and the assembly was contained in a Teflon vessel 15 to construct a cell.

The current density at charging and discharging was set at 1 mA/cm$^2$. At first, discharging was conducted until the battery voltage became 2.0V and charging was than carried out at the same current density until the battery voltage became 4.5V. Under the same conditions, the charging-discharging operation was repeated.

At the 5th cycle, the charge-discharge quantity became substantially constant and the value was 6.15 C. This quantity of coulomb corresponded to the doping level of 58 mole % to the polyaniline as the positive electrode and also to the doping level of 32 mole % to the poly-p-phenylene as the negative electrode. At the 50th cycle, the charge-discharge quantity was substantially the same as the charge-discharge quantity at the 5th cycle. At the 51st cycle, the self-discharge test was carried out for 720 hours. The self-discharge ratio in about 1 month was 10%.

At the 50th cycle, the energy density of this battery per weight of the positive electrode and negative electrode (exclusive of carbon black) was 198 Wh/kg.

COMPARATIVE EXAMPLE 2

(Treatment of Polyaniline)

Polyaniline obtained by carrying out the polymerization in the same manner as described in Example 2 was washed in distilled water with stirring for 30 minutes, and the distilled water used was exchanged with fresh distilled water and washing was similarly repeated 3 times. Then, the polymer was dried under reduced pressure at 80° C. for 4 hours and washed with a mixed solvent comprising PC and DME at a volume ratio of 1/1 for 30 minutes, and the polymer was dried under reduced pressure at 80° C. for 2 hours.

(Battery Performance Test)

A disc having a diameter of 10 mm was obtained by placing a mixture of 15 mg of the polyaniline treated according to the above-mentioned method and 1.5 mg of carbon black on a platinum net and compression-molding the mixture, and set as the positive electrode in the same cell as used in Example 1. Discharging was conducted at a constant current density of 1 mA/cm$^2$ until the voltage became 2.0V. A coulomb quantity of 2.15 C was obtained. Then, the net weight of the polyaniline was measured. It was found that the net weight of the polyaniline was 13.3 mg. A cell shown in FIG. 2 was constructed by using this polyaniline as the positive electrode as in Example 2 and a molded body of a mixture of 15 mg of poly-p-phenylene prepared in the same manner as described in Example 2 and 1.5 mg of carbon black as the negative electrode, and the battery performance characteristics were examined.

The charging-discharging test was carried out under the same conditions as described in Example 2. A substantially constant quantity of coulomb was obtained at the 6th cycle and the value was 5.81 C.

This quantity of electricity corresponded to the doping level of 41 mole % to the polyaniline as the positive electrode and also to the doping level of 30 mole % to the poly-p-phenylene as the negative electrode.

At the 50th cycle, the energy density of the battery determined from the discharge curve per weight of the positive and negative electrodes (exclusive of carbon black) was 165 Wh/kg.

When the self-discharge test was carried out for 720 hours at the 51st cycle, it was found that the self-discharge ratio in about 1 month was 34%.

EXAMPLE 3

A solution of 0.22 mole/l of 2,5-dimethylaniline in an aqueous solution containing 1.5 mole/l of HBF$_4$ was prepared. The electrolytic polymerization was carried out under the same conditions as described in Example 1 to obtain poly(2,5-dimethylaniline) on the surfaces of the platinum plate. In the same manner as described in Example 1, the obtained poly(2,5-dimethylaniline) was alkali-washed and dried under a reduced pressure. The weight of the poly(2,5-dimethylaniline) was 6.3 mg.

By using this poly(2,5-dimethylaniline) as the positive electrode, metallic Li pressed on to a nickel net as the negative electrode and a PC solution containing 1 mole/l of LiClO$_4$ as the electrolytic solution, the battery characteristics were examined in a cell as shown in FIG. 1.

The set voltage and current density for charging and discharging were the same as in Example 1.

In this battery, at the 5th cycle, the charge-discharge quantity reached a substantially constant level, and since then, the charge-discharge quantity was hardly changed and the change-discharge quantity at the 50th cycle was 3.12 C. The energy density of the battery per weight of the positive electrode was 410 Wh/kg.

When the self-discharge test was carried out for 720 hours at the 51st cycle, the self-discharge ratio in about 1 month was 12%.

COMPARATIVE EXAMPLE 3

Poly(2,5-dimethylaniline) obtained by conducting the polymerization under the same conditions as described in Example 3 was washed and dried under reduced pressure in the same manner as described in Example 1. By using this poly(2,5-dimethylaniline) as the positive electrode, metallic Li as the counter electrode and a PC solution containing 1 mole/l of LiClO$_4$ as the electrolytic solution, the battery characteristics were examined in a cell as shown in FIG. 1 under the same conditions as described in Example 3.

The charge-discharge quantity of this battery at the 50th cycle was 2.70 C, and the energy density per weight of the positive electrode was 302 Wh/kg.

When the self-discharge test was carried out for 720 hours at the 51st cycle, it was found that the self-discharge ratio in about 1 month was 27%.

EXAMPLE 4

(Alkali Treatment of Polyaniline)

Polyaniline prepared in the same manner as described in Example 1 was immersed together with the platinum plate in distilled water for about 30 minutes, and the filmy polyaniline was then immersed together with the platinum plate in a 1N aqueous solution of NaOH in about 1 hour. Ultrasonic vibration was applied for about 1 minute during the immersion in the aqueous solution of NaOH.

The filmy polyaniline was transferred together with the platinum plate into distilled water, and the above-mentioned operation was repeated two times. Finally, the filmy polyaniline was washed together with the platinum plate with distilled water for about 1 hour. The pH value of the washing water was 7.4. Then, the filmy polyaniline was dried under a reduced pressure at 80° C. for 4 hours.

(Battery Performance Test)

An experimental cell having the same structure as described in Example 1 was assembled by using the thus-treated polyaniline.

The assembled cell was discharged at a constant current density of 5 mA/cm$^2$ until the voltage became 2.0V, but no substantial electric current flowed. Then, the call was immediately charged at the same current density until the battery voltage became 4.3V. The above operation was repeated under the same conditions.

At the 5th cycle, the charge quantity and discharge quantity became substantially constant and the quantity of electricity was 3.187 C. from this value, it was found that 50 mole % of the dopant could be charged and discharged.

The charging-discharging operation was further repeated. The charging-discharging efficiency was substantially 100%. The charging-discharging quantity at the 200th cycle was the same as that at the 4th cycle.

After the charging operation of the 201st cycle, the self-discharge test was carried out. After 720 hours' standing, the discharging quantity was 2.96 C, and the self-discharge ratio in about 1 month was 6.9%.

At the 200th cycle, the electric capacitance density of the battery per weight of the positive electrode was 147 Ah/kg and the energy density was 440 Wh/kg.

EXAMPLE 5

(Preparation of Polyaniline)

A glass vessel was charged with distilled water, from which oxygen had been sufficiently removed, HBF$_4$ and aniline, and the concentrations of HBF$_4$ and aniline were adjusted to 1.5 mole/l and 0.35 mole/l, respectively. Two platinum electrodes having a surface area of 6 cm$^2$ were arranged in the aqueous solution while a distance of 2 cm was taken between the platinum electrodes. Electrolysis was carried out with stirring at a current flow rate of 120 A.sec. A dense-green polymer was precipitated on the positive electrode. The covered positive electrode was washed with distilled water three times and air-dried, and the formed polyaniline film was separated from the platinum plate.

(Alkali Treatment and Heat Treatment of Polyaniline)

The separated polymer was immersed in 28% aqueous ammonia and allowed to stand overnight, and the polymer was washed with distilled water three times repeatedly and dried in vacuo at 250° C. for 15 hours.

The elementary analysis values of the thus-treated polyaniline were 79.38% by weight for C, 5.10% by weight for H and 15.30% by weight for N, and the C/H/N atomic ratio was 6.05/4.63/1.00. Thus, it was confirmed that the purity was considerably high.

(Preparation of Filmy Acetylene High Polymer)

In a nitrogen atmosphere, a glass reaction vessel having an inner capacity of 500 ml was charged with 1.7 ml of titanium tetrabutoxide, and 30 ml of anisole was further added to form a solution. Then, 2.7 ml of triethyl-aluminum was added to the solution with stirring to form a catalyst solution.

The reaction vessel was cooled with liquid nitrogen and the nitrogen gas in the reaction vessel was discharged by a vacuum pump. Then, the reaction vessel was cooled to $-78°$ C. and purified acetylene gas under a pressure of 1 atmosphere was then blown into the reaction vessel while keeping the catalyst solution stationary.

Immediately, the polymerization occurred on the surface of the catalyst solution to form a filmy acetylene high polymer. When 30 minutes had passed from the initiation of introduction of acetylene, the acetylene gas was discharged to stop the polymerization. In a nitrogen atmosphere, the catalyst solution was discharged by a syringe, and the formed polymer was washed with 100 ml of refined toluene 5 times repeatedly while maintaining the temperature at $-78°$ C. The filmy acetylene high polymer swollen with toluene was a uniform swollen film composed of fibrils densely entangled with one another. The swollen film was dried in vacuo to obtain a reddish violet filmy acetylene high polymer having a metallic luster, a thickness of 180 $\mu$m and a cis content of 98%. The bulk density of this filmy acetylene high polymer was 0.30 g/cc and the electric conductivity was $10^{-9}$ $\Omega^{-1}-$cm$^{-1}$ as determined at 20° C. according to the direct current four-terminal method.

(Battery Test)

Discs having a diameter of 20 mm were cut out from the treated polyaniline film and the filmy acetylene high polymer, and a cell as shown in FIG. 2 was constructed by using them as active material of positive and negative electrodes. More specifically, a collector 13 of a platinum net for the positive electrode was placed in the lower portion of the recess of a Teflon vessel 15, and a positive electrode 12 was placed on the platinum net collector 13 for the positive electrode and a porous polypropylene separator 11 was piled on the collector 13 and sufficiently impregnated with an electrolytic solution. A negative electrode 10 was piled on the separator 11 and a collector 9 of a platinum net for the negative electrode was piled on the negative electrode 10. The Teflon vessel 15 was clamped to construct a battery.

A solution of 1 mole/l of LiPF$_6$ in a mixed solvent of propylene carbonate and 1,2-dimethoxyethane (volume ratio=1/1), which was sufficiently dehydrated by distillation according to customary procedures, was used as the electrolytic solution.

In an argon atmosphere, the thus-constructed battery was charged under a constant electric current (1.5 mA/cm$_2$) while supplying electricity in such an amount that the doping quantities to the positive and negative electrodes were 50 mole % and 6 mole %, respectively. After completion of the charging, the battery was discharged under a constant current (2.0 mA/cm$_2$) and when the battery voltage was reduced to 1.0V, the charging was carried out again under the same conditions as described above. In this manner, the charging-discharging operation was repeated. This operation could be repeated 1210 times before the charging-discharging efficiency was reduced to 70%.

At the 5th repetition cycle, the energy density was 136 W.hr/kg and the maximum charging-discharging efficiency was 100%. When the battery was allowed to stand in the charged state for 63 hours, the selfdischarge ratio was 1.8%.

EXAMPLE 6

(Preparation of Polyaniline)

A 1-liter three-neck flask was charged with 400 ml of sufficiently oxygen-removed distilled water and 100 ml of a 42% aqueous solution of $HBF_4$, and the solution was bubbled with a nitrogen gas for about 1 hour with stirring. Then, the inner atmosphere of the reaction vessel was substituted by a nitrogen gas, a thermometer and a condenser were attached to the flask and the solution was maintained at 49° C. by warm water. Then, 20 g of aniline was added to the solution, and a solution of 46 g of ammonium persulfate in 200 cc of a 1N aqueous solution of $HBF_4$ was dropped to the aqueous solution of aniline over a period of about 2 hours with stirring. Then, reaction was advanced at 49° C. for 3 hours. After the reaction, the liquid reaction mixture having a dense green color was filtered to obtain polyaniline having a dense green color.

(Alkali Treatment and Heat Treatment of Polyaniline)

The polyaniline was immersed in 500 ml of 28% aqueous ammonia and was allowed to stand overnight. After filtration, the polymer was washed with 200 ml of distilled water 3 times repeatedly and dried in vacuo at 250° C. for 15 hours.

The elementary analysis values of the obtained treated polymer were 79.36% by weight for C, 5.20% by weight for H and 15.28% by weight for N, and the C/H/N atomic ratio was 6.06/4.73/1.00.

(Battery Test)

The battery test was carried out in the same manner as described in Example 5 except that a molded body (compression vacuum molding under 100 kg/cm² for 5 minutes; containing 10% of carbon black) of the treated polymer obtained according to the above-mentioned procedures was used as the positive electrode. The charging-discharging operation could be repeated 1081 times before the charging-discharging efficiency was reduced to 70%. The energy density of the battery was 132 W.hr/kg and the maximum charging-discharging efficiency was 100%. When the battery was allowed to stand in the charged state for 63 hours, the self-discharge ratio was 2.1%.

EXAMPLE 7

The battery test was carried out in the same manner as described in Example 5 except that poly-p-phenylene prepared according to the process disclosed in Bull. Chem. Soc. Japan, 51, 2091 (1978) was used instead of the acetylene high polymer used as the negative electrode in Example 5 and a disc having a diameter of 20 mm, which was formed by molding the poly-p-phenylene under a pressure of 1 ton/cm², was used as the negative electrode. The charging-discharging operation could be repeated 1481 times before the charging-discharging efficiency was reduced to 70%. The energy density of the battery was 143 W.hr/kg and the maximum charging-discharging efficiency was 100%. When the battery was allowed to stand in the charged state for 63 hours, the self-discharge ratio was 1.6%.

EXAMPLE 8

The battery test was carried out in the same manner as described in Example 5 except that an Li-Al alloy (atomic ratio=1/1) was used as the negative electrode instead of the acetylene high polymer used as the negative electrode in Example 5. The charging-discharging operation could be repeated 1018 times before the charging-discharging efficiency was reduced to 70%. The energy density of the battery was 210 W.hr/kg and the maximum charging-discharging efficiency was 100%. When the battery was allowed to stand in the charged state for 63 hours, the self-discharge ratio was 1.4%.

EXAMPLE 9 AND 10 AND COMPARATIVE EXAMPLE 4 AND 5

The battery test was carried out in the same manner as described in Example 5 except that the temperature of the heat treatment of the polyaniline used as the positive electrode was changed as indicated in Table 1. The frequency (times) of repetition that could be conducted before the charging-discharging efficiency was reduced to 70%, the energy density, the maximum charging-discharging efficiency and the self-discharge ratio after 63 hours' standing after charging were determined. The obtained results are shown in Table 1.

TABLE 1

|  | Temperature (°C.) of Heat Treatment of Polyaniline | Repetition Frequency (times) | Energy Density (W · hr/kg) | Maximum Charging-Discharging Efficiency (%) | Self-Discharge Ratio (%) |
|---|---|---|---|---|---|
| Comparative Example 5 | 50 | 715 | 128 | 100 | 7.8 |
| Example 10 | 150 | 1008 | 135 | 100 | 2.0 |
| Example 11 | 300 | 978 | 133 | 100 | 2.1 |
| Comparative Example 6 | 550 | 360 | 110 | 99 | 10.5 |

EXAMPLE 11

The polyaniline obtained in Example 5 was washed with distilled water without carrying out the ammonia treatment, and the polyaniline was dried in vacuo at 250° C. for 15 hours. The elementary analysis values were 79.43% by weight for C, 5.10% by weight for C, 5.10% by weight for H and 15.29% by weight for N, and the C/H/N atomic ratio was 6.06/4.64/1.00.

The battery test was carried out in the same manner as described in Example 5 except that the thus-treated polymer was used as the positive electrode. The charging-discharging operation could be repeated 981 times before the charging-discharging efficiency was reduced to 70%. The energy density of this battery was 132 W.hr/kg and the maximum charging-discharging efficiency was 100%. When the battery was allowed to stand in the charged state for 63 hours, the self-discharge ratio was 2.5%.

EXAMPLE 12

(Preparation of Polyaniline, and Electrochemical Reduction and Alkali Treatment thereof)

Polyaniline prepared on a platinum plate by carrying out electrolytic polymerization in the same manner as described in Example 1 was washed with distilled water for 30 minutes, dried under a reduced pressure at 80° C. for 4 hours and then immersed in a solution of 1 mole/l of $LiBF_4$ in a mixed solvent comprising PC (propylene carbonate) and DME (1,2-dimethoxyethane) at a volume ratio of 1/1. In a cell as shown in FIG. 1, by using metallic Li pressed onto a nickel net as the counter electrode and an Li/Li+ electrode as the reference electrode, discharging was performed at a constant current density of 0.5 $mA/cm^2$ until the voltage of the polyaniline electrode to the reference electrode became 2.0V. The quantity of discharged coulomb was 2.43 C.

This polyaniline was washed with DME and dried at 80° C. for 3 hours, and the weight of the polyaniline was measured. It was found that the weight of the polyaniline was 8.1 mg. The color of the polyaniline was changed to light green.

Then, the polyaniline was immersed together with the platinum plate in aqueous ammonia having a concentration of 28% by weight for about 1 hour. Ultrasonic vibration was applied for about 1 minute during the immersion. Then, the filmy polyaniline was transferred together with the platinum plate in distilled water, and the above operation was repeated two times. Finally, the polyaniline was washed together with the platinum plate with distilled water for about 1 hour. The pH value of the washing water was 7.2. Then, the polyaniline was dried under a reduced pressure at 80° C. for 4 hours. The weight of the dried polyaniline was 5.6 mg and the polyaniline was yellow in color.

(Construction of Experimental Cell)

An experimental cell as shown in FIG. 2 was constructed. The polyaniline obtained on the platinum plate by the above-mentioned procedures was used as the positive electrode while using the platinum plate as the collector. A disc having a diameter of 15 mm was prepared by placing 100 mg of a powdery alloy comprising Li and Al at an atomic ratio of 50/50 on a nickel plate and compression-molding the powder at about 350° C., and used as the negative electrode. Nickel wires were taken out from a part of the nickel net as leads of the negative electrode.

A solution of 1 mole/l of $LiBF_4$ in a mixed solvent comprising PC (propylene carbonate) and DME (1,2-dimethoxyethane) at a volume ratio of 1/1 was used as the electrolytic solution.

(Battery Performance Test)

The assembled battery was discharged at a constant current density of 5 $mA/cm^2$ until the voltage became 2.0V, but almost no electric current flowed. Immediately, charging was carried out at the same current density until the battery voltage became 4.0V. The above operation was repeated under the same conditions. At the 6th cycle, either the charge quantity or the discharge quantity was substantially constant, and the quantity of coulomb was 3.35 C. From the calculation based on this value, it was found that the dopant could be charged and discharged in an amount of 56 mole % based on the monomer units (91 g) of the polyaniline as the positive electrode.

The above-mentioned charging-discharging operation was repeated. The charging-discharging efficiency was almost 100%. At the 200th cycle, the same quantity of electricity as at the 6th cycle could be charged and discharged. After charging of the 201st cycle, the battery system was allowed to stand in an open circuit for 720 hours, and the self-discharge test was carried out. The discharge coulomb quantity after 720 hours' standing was 3.30 C, and the self-discharge ratio in about 1 month was 1.5%. At the 200th cycle, the electric capacity density of the battery per weight of the positive electrode was 166 Ah/kg and the energy density was 497 Wh/kg.

COMPARATIVE EXAMPLE 6

(Preparation of Polyaniline)

Polyaniline was prepared by carrying out polymerization on a platinum plate in the same manner as described in Example 12, and the weight of the polyaniline obtained on the platinum plate was 9.6 mg as in Example 12.

(Treatment of Polyaniline and Battery Performance Test)

By using the same electrolytic solution and experimental cell as described in Example 12, the battery characteristics were examined under the same conditions as described in Example 12. The obtained results were substantially the same as those obtained in Comparative Example 1.

EXAMPLE 13

(Preparation of Polyaniline, and Electrochemical Reduction and Alkali Treatment thereof)

Powdery polyaniline obtained in the same manner as described in Example 2 was transferred into distilled water and washed with stirring for about 10 minutes. Then, the polyaniline was dried under reduced pressure at 80° C. for 3 hours. Then, 1.0 mg of Teflon as the binder and 1.0 mg of carbon black as the electroconductive assistant were incorporated into 10.0 mg of the dried polyaniline, and 12.0 mg as a whole of the resulting powder was sufficiently blended. The powdery mixture was molded into a disc having a diameter of 10 mm, in which a platinum net as a collector was included. A platinum wire was taken out as a lead from the platinum net. In a cell as shown in FIG. 1, by using a solution of 1 mole/l of $LiBF_4$ in a mixed solvent of PC and DME as the electrolytic solution and a lithium plate pressed to a nickel net as the counter electrode, the polyaniline was electrochemically reduced. At the initial stage, the voltage of the polyaniline electrode to the lithium counter electrode was 3.45V, but when a reducing electric current was applied at a constant current density of 0.1 $mA/cm^2$ until the voltage to the lithium counter electrode became 2.0V, an electricity quantity of 3.12 C was obtained. Then, the polyaniline electrode containing the platinum net therein was immersed in aqueous ammonia having a concentration of 28% by weight for 30 minutes, and the electrode was washed in distilled water for 30 minutes. The abovementioned ammonia treatment and distilled water washing treatment were repeated 3 times. The pH value of the distilled water after the final washing was 7.2. Then, the polyaniline electrode was dried under reduced pressure at 80° C. for 4 hours. When the weight of the polyaniline electrode was measured, it was found that the weight was decreased by the above treatments and the net weight of the polyaniline was 7.25 mg.

(Battery Performance Test)

The polyaniline treated according to the above-mentioned method was used as the positive electrode. A mixture of 15 mg of powdery poly-p-phenylene synthesized from dibromobenzene by using a Grignard reagent according to the process disclosed in T. Yamamoto and A. Yamamoto, Chem. Lett., 1977, 353, 1.5 mg of acetylene black and 1.5 mg of Teflon powder was placed on a nickel net and compression-molded into a disc having a diameter of 10 mm, and the disc was used as the negative electrode. A polypropylene separator impregnated with an electrolytic solution of 1 mole/l of $LiBF_4$ in a mixed solvent comprising PC and DME at a volume ratio of 1/1 was interposed between the positive and negative electrodes. By using the thus-constructed experimental cell as shown in FIG. 2, the battery characteristics were examined. The current density for charging and discharging was set at 5 mA/cm$^2$, and discharging was first conducted until the battery voltage was reduced to 2.0V and then, charging was carried out at the same current density until the battery voltage was elevated to 4.3V. The charging-discharging operation was repeated under the same conditions.

At the 8th cycle, the charge-discharge coulomb quantity became substantially constant, and the value was 4.96 C. This value corresponded to a doping level of 65 mole % to the net polyaniline as the positive electrode and also to a doping level of 26 mole % to the poly-p-phenylene as the negative electrode. At the 200th cycle, the same coulomb quantity as at the 8th cycle could be charged and discharged. When the self-discharge test was carried out for 720 hours at the 201st cycle, it was found that the self-discharge ratio in about 1 month was 3.2%.

At the 200th cycle, the energy density of this battery per weight of the positive and negative electrodes (exclusive of carbon black and Teflon powder) was 186 Wh/kg.

EXAMPLE 14

(Alkali Treatment of Polyaniline)

An aqueous solution containing 28% by weight of $NH_4OH$ was added to the polymerization liquid containing polyaniline, obtained in the same manner as in Example 13, in such an amount that the amount of $NH_4OH$ was 1 mole per mole of hydrochloric acid contained in the polymerization liquid. Thus, the polyaniline-containing polymerization liquid was neutralized for about 2 hours with stirring.

Then, the polyaniline was transferred into distilled water and washing was conducted for 1 hour with stirring. The distilled water used was exchanged with fresh distilled water and washing was further conducted for 30 minutes. The pH value of the washing water was 7.1. Then, the washed polyaniline was dried under a reduced pressure at 80° C. for 4 hours.

(Battery Performance Test)

The same cell as used in Example 13 was constructed. A mixture of 10 mg of the polyaniline treated according to the above-mentioned method, 1.0 mg of carbon black and 1.0 mg of Teflon powder was placed on a platinum net and compression-molded into a disc having a diameter of 10 mm, and the disc was used as the positive electrode. A negative electrode prepared by adding carbon black and Teflon powder to poly-p-phenylene and molding the mixture in the same manner as described in Example 13 was used. The same electrolytic solution as used in Example 13 was used. After setting of the battery, discharging was carried out at a constant current density of 0.1 mA/cm$^2$ until the cell voltage was reduced to 2.0V. The quantity of flowing coulomb was 0.12 C.

Then, charging was conducted at a constant current density of 5.0 mA/cm$^2$ until the cell voltage was elevated to 4.3V, and immediately, discharging was conducted at a current density of 5.0 mA/cm$^2$ until the cell voltage was reduced to 2.0V. The charging-discharging operation was repeated under the same conditions to examine the characteristics of the battery. At the 9th cycle, the quantity of coulomb reached a substantially constant level, and the value was 5.02 C. This coulomb quantity corresponded to a doping level of 48 mole % to the polyaniline as the positive electrode and also to a doping level of 26 mole % to the poly-p-phenylene as the negative electrode.

The energy density of the battery per weight of the positive and negative electrodes (exclusive of carbon powder and Teflon powder), determined from the discharge curve at the 200th cycle, was 165 Wh/kg. When the self-discharge test was carried out for 720 hours at the 201st cycle, the self-discharge ratio in about 1 month was 25%.

EXAMPLE 15

2-Methoxyaniline was dissolved at a concentration of 0.22 mole/l in an aqueous solution containing $HBF_4$ at a concentration of 1.5 mole/l, and electrolytic polymerization was carried out under the same conditions as described in Example 12 to obtain ply(2-methoxyaniline) on the surface of the platinum plate. In the same manner as described in Example 12, the obtained poly(2-methoxyaniline was electrochemically reduced, subjected to alkali washing and then dried under a reduced pressure. When the weight of the poly(2-methoxyaniline) was measured, it was found that the weight was 6.3 mg.

In a cell as shown in FIG. 1, the battery characteristics were examined by using this poly(2-methoxyaniline) as the positive electrode, metallic Li pressed onto a nickel net as the negative electrode and a solution of 1 mole/l of $LiClO_4$ in PC as the electrolytic solution. The set voltage and current density for charging and discharging were the same as in Example 13.

At the 7th cycle, the charge-discharge coulomb quantity reached a substantially constant level, and the charge-discharge quantity was not substantially charged at subsequent cycles and at the 50th cycle, the charge-discharge coulomb quantity was 2.85 C. The energy density of the battery per weight of the positive electrode was 370 Wh/kg. When the self-discharge test was carried out for 720 hours at the 51 set cycle, it was found that the self-discharge ratio in about 1 month was 8%.

COMPARATIVE EXAMPLE 7

Poly(2-methoxyaniline) obtained by conducting the polymerization under the same conditions as described in Example 15 was subjected to the washing treatment in the same manner as described in Comparative Example 6, and the poly(2-mathoxyaniline) was then dried under reduced pressure. In a cell as shown in FIG. 1, the battery characteristics were examined under the same conditions as described in Example 15 by using this poly(2-methoxyaniline) as the positive electrode, metallic Li as the counter electrode and a solution of 1 mole/l of $LiClO_4$ in PC as the electrolytic solution.

At the 50th cycle, the charge-discharge coulomb quantity of this battery was 2.60 C and the energy density per weight of the positive electrode was 320 Wh/kg. When the self-discharge test was carried out for 720 hours at the 51st cycle, it was found that the self-discharge ratio in about 1 month was 35%.

EXAMPLE 16

Poly(2-methoxyaniline) obtained by carrying out the polymerization under the same conditions as described in Example 15 was subjected to the washing treatment in the same manner as described in Example 1 and then dried under reduced pressure. The battery characteristics were examined under the same conditions as described in Example 15.

At the 50th cycle, the charge-discharge coulomb quantity of the battery was 2.78 C, and the energy density per weight of the positive electrode was 350 Wh/kg. When the self-discharge test was carried out for 720 hours at the 51st cycle, it was found that the self-discharge ratio in about 1 month was 15%.

EXAMPLE 17

(Electrochemical Reduction Treatment of Polyaniline and Construction of Experimental Cell)

Polyaniline was prepared in the same manner as described in Example 12. The filmy polyaniline obtained on the platinum plate by electrolytic polymerization was dried under reduced pressure at 80° C. for 4 hours and then immersed in a solution of 1 mole/l of $LiBF_4$ in a mixed solvent comprising PC and DME at a volume ratio of 1/1. In a cell as shown in FIG. 1, by using metallic Li as the counter electrode and an $Li/Li^+$ electrode as the reference electrode, discharging was carried out at a constant current density of 0.5 $mA/cm^2$ until the voltage of the polyaniline electrode to the reference electrode was reduced to 2.0V. The obtained discharge coulomb quantity was 2.45 C. The polyaniline was washed with DME and dried at 80° C. for 3 hours, and an experimental cell having the same structure as described in Example 12 was assembled.

(Battery Performance Test)

In the assembled battery, discharging was carried out at a constant current density of 5 $mA/cm^2$ until the voltage was reduced to 2.0V. Almost no electric current flowed. Then, charging was immediately carried out at the same current density until the voltage was elevated to 4.0V. The charging-discharging operation was repeated and the battery characteristics were examined in the same manner as described in Example 12.

At the 6th cycle, the discharge-charge coulomb quantity of the battery was substantially constant and the value was 3.18 C.

EXAMPLE 18

(Preparation of Polyaniline)

A 1-liter three-neck flask was charged with 400 ml of preliminarily oxygen-removed distilled water and 100 ml of a 42% aqueous solution of $HBF_4$, and the solution was bubbled with a nitrogen gas with stirring for about 1 hour. The inner atmosphere was substituted with nitrogen, a thermometer and a condenser were attached to the flask, and the flask was cooled by water and ice to lower the solution temperature to 150° C. Then, 20.0 g of aniline was added to the solution. After aniline was dissolved in the solution, 22 g of ammonium persulfate was gradually added and reaction was conducted for 5 hours with stirring at an inner temperature maintained below 25° C. After completion of the reaction, the brownish green reaction liquid was filtered and the solid was dried in vacuo to obtain 15 g of a product having a dense green color. The obtained product was immersed in 300 ml of 10% aqueous ammonia and stirred at room temperature overnight, and the liquid was filtered. The obtained solid was washed with 1000 ml of distilled water and then dried in vacuo at 80° C. for 15 hours.

Then, the product was immersed in 1000 ml of 1,2-dimethoxyethane and stirred at room temperature for 5 hours, and the solid was recovered by filtration, washed with 500 ml of 1,2-dimethoxyethane and then dried in vacuo at 80° C. for 15 hours. From the elementary analysis values of the obtained violet powder, it was found that the sum of C, H and N was 99.36% by weight and the C/H/N atomic ratio was 6.00/4.51/0.99. Accordingly, it was confirmed that the product was undoped polyaniline represented by the following formula:

(Complexing of Undoped Polyaniline with Protonic Acid)

In 500 ml of a 0.1 N aqueous solution of $HBF_4$, 5 g of the above-mentioned undoped polyaniline was immersed, and the liquid was stirred at room temperature for about 3 hours. The liquid was filtered, and the recovered solid was washed with 500 ml of distilled water and dried in vacuo at 80° C. for 15 hours to obtain a powder having a dense blue color.

(Preparation of Filmy Acetylene High Polymer)

In a nitrogen atmosphere, a 500-ml glass reaction vessel was charged with 1.7 ml of titanium tetrabutoxide, and 30 ml of anisole was added to form a solution. Then, 2.7 ml of triethylaluminum was added to the solution with stirring to prepare a catalyst solution.

The reaction vessel was cooled by liquid nitrogen and the nitrogen gas in the reaction system was removed by a vacuum pump. Then, the reaction vessel was cooled to $-78°$ C. and refined acetylene gas was blown under a pressure of 1 atmosphere while keeping the catalyst solution stationary.

Immediately, polymerization occurred on the surface of the catalyst solution to form a filmy acetylene high polymer. After 30 minutes had passed from the initiation of introduction of acetylene, the acetylene gas was discharged to stop the polymerization. In a nitrogen atmosphere, the catalyst solution was removed by a syringe, and the filmy acetylene high polymer was washed with 100 ml of refined toluene while maintaining the temperature at $-78°$ C. The filmy acetylene high polymer swollen with toluene was a homogeneous swollen film composed of fibrils densely entangled with one another. The swollen film was dried in vacuo to obtain a reddish violet filmy acetylene high polymer having a metallic luster, a thickness of 180 $\mu m$ and a cis content of 98%. The bulk density of the filmy acetylene high polymer was 0.30 g/cc, and the electrical conductivity was $3.2 \times 10^{-9} \Omega^{-1} -cm^{-1}$ as determined at 20° C. according to the direct current four-terminal method.

(Battery Test)

The above-mentioned polyaniline powder obtained by complexing undoped polyaniline with the protonic acid was compression-molded into a disc having a diameter of 20 mm according to the known method and a disc having a diameter of 20 mm was cut out from a lithium foil having a thickness of 200 $\mu m$. An experimental cell as shown in FIG. 2 was constructed by using these discs as active materials of positive and negative electrodes. More specifically, a platinum net collector 6 for the positive electrode was placed in the lower portion of a recess of a Teflon vessel 8, a positive electrode 5 was piled on the platinum net collector 6 for the positive electrode, a porous polypropylene separator 4 was piled on the positive electrode 5, the separator 4 was sufficiently impregnated with an electrolytic solution, a negative electrode 3 was piled on the separator 4, a platinum net collector 2 for the negative electrode was placed on the negative electrode 3, and the Teflon vessel 8 was clamped to construct a battery.

A solution of 1 mole/l of $LiPF_6$ in a mixed solvent comprising PC which was sufficiently dehydrated by distillation according to customary procedures and DME at a volume ratio of 1/1 was used as the electrolytic solution.

In the thus-assembled battery, in an argon atmosphere, discharging was carried out at a constant current density of 1.5 mA/cm$^2$ until the battery voltage became 1.5V. Then, the battery was disassembled, and the lithium foil of the negative electrode was substituted by a disc having a diameter of 20 mm, which was cut out from a filmy acetylene high polymer prepared in the above-mentioned manner and the battery was assembled again. In an argon atmosphere, charging was carried out at a constant current density of 1.5 mA/cm$^2$ which supplied such a quantity of coulomb that the doping levels to the positive and negative electrodes were 65 mole % and 6 mole %, respectively. After completion of charging, discharging was carried out at a constant current density of 5.0 mA/cm$^2$ until the battery voltage became 0.15V. Then, charging was carried out under the same conditions as described above. Thus, the charging-discharging operation was repeated. The charging-discharging operation could be repeated 833 times before the charging-discharging efficiency was reduced to 70%.

At the 5th cycle, the energy density was 143 W.hr/kg and the maximum charging-discharging efficiency was 100%. When the battery was allowed to stand still in the charged state for 70 hours, the self-discharge ratio was 2.1%.

EXAMPLES 19 THROUGH 23

The battery test was carried out in the same manner as described in Example 18 except that polyaniline complexed with an aqueous solution of a protonic acid shown in Table 2 instead of the 0.1 N aqueous solution of $HBF_4$ used in Example 18 was used. The obtained results are shown in Table 2.

TABLE 2

| Example No. | Protonic Acid | Concentration of Protonic Acid (mole/l) | Repetition Cycle Life (times) | Energy Density (W · hr/kg) | Maximum Charging-Discharging Efficiency (%) | Self-Discharge Ratio (%) |
| --- | --- | --- | --- | --- | --- | --- |
| 19 | $HPF_6$ | 0.1 | 821 | 146 | 100 | 1.8 |
| 20 | HCl | 0.1 | 801 | 140 | 100 | 2.3 |
| 21 | $HClO_4$ | 0.1 | 798 | 141 | 100 | 2.1 |
| 22 | $HBF_4$ | 0.5 | 803 | 138 | 100 | 1.9 |
| 23 | $HBF_4$ | 1.0 | 800 | 139 | 100 | 1.8 |

COMPARATIVE EXAMPLE 8

The battery test was carried in the same manner as described in Example 18 except that conversion of the doped polyaniline to an undoped state with aqueous ammonia was not carried out and the doped polyaniline complexed with $HBF_4$ was used.

The maximum charging-discharging efficiency was 95%, and when the charging-discharging operation was repeated 118 times, the charging-discharging efficiency was reduced below 70%.

EXAMPLE 24

The battery test was carried out in the same manner as described in Example 18 except that a disc having a diameter of 20 mm, which was obtained by compression-molding under a pressure of 1 ton/cm$_2$ poly-p-phenylene prepared according to the process disclosed in Bull. Chem. Soc. Japan., 51, 2091 (1978), was used as the negative electrode instead of the acetylene high polymer used as the negative electrode in Example 18. The charging-discharging operation could be repeated 822 times before the charging-discharging efficiency was reduced to 70%. The energy density of the battery was 148 W.hr/kg, and the maximum charging-discharging efficiency was 100%. When the battery was allowed to stand still in the charged state for 70 hours, the self-discharge rate was 2.5%

EXAMPLE 25

The battery test was carried out in the same manner as described in Example 18 except that an Li/Al alloy (atomic ratio=1/1) was used as the negative electrode instead of the acetylene high polymer used as the negative electrode in Example 18. The charging-discharging operation could be repeated 1018 times before the charging-discharging efficiency was reduced to 70%. The energy density of the battery was 211 W.hr/kg and the maximum charging-discharging efficiency was 100%. When the battery was allowed to stand in the charging state for 70 hours, the self-discharge ratio was 1.5%.

EXAMPLES 26 THROUGH 28

The complexing with the protonic acid and the battery test were carried out in the same manner as described in Example 18 except that an aniline derivative shown in Table 3 was polymerized instead of aniline used in Example 18. The obtained results are shown in Table 3.

TABLE 3

| Example No. | Monomer | Repetition Cycle Life (times) | Energy Density (W · hr/kg) | Maximum Charging-Discharging Efficiency (%) | Self-Discharge Ratio (%) |
|---|---|---|---|---|---|
| 26 | 2-methylaniline | 850 | 121 | 100 | 2.5 |
| 27 | 2-methoxyaniline | 780 | 118 | 100 | 2.8 |
| 28 | o-phenylenediamine | 560 | 156 | 100 | 4.3 |

EXAMPLE 29

The polyaniline prepared in Example 18 was not subjected to the ammonia treatment but was washed with DME and dried in vacuo at 80° C. for 15 hours. The polymer was compression-molded into a disc having a diameter of 20 mm according to known procedures. The disc was immersed in a solution of 1 mole/l of LiClO$_4$ in PC and the polymer was electrochemically converted to an undoped state under a constant voltage of 2.5V by using a lithium foil as the counter electrode. The thus-obtained molded disc of undoped polyaniline was immersed in 100 ml of a 0.1 N aqueous solution of HBF$_4$ and ultrasonic vibration was applied at room temperature for about 15 hours to effect complexing with the protonic acid. Then, the molded polymer was washed with 100 ml of distilled water and then dried in vacuo at 80° C. for 15 hours. The battery test was carried out in the same manner as described in Example 18. The charging-discharging operation could be repeated 735 times before the charging-discharging efficiency was reduced to 70%. At the 5th cycle, the energy density was 138 W.hr/kg, and the maximum charging-discharging efficiency was 100%. When the battery was allowed to stand in the charged state for 70 hours, the self-discharge ratio was 2.5%.

EXAMPLE 30

The polyaniline obtained in Example 18 was not subjected to the ammonia treatment but was washed with DME and dried in vacuo at 250° C. for 15 hours to obtain undoped polyaniline.

The polyaniline was complexed with the protonic acid in the same manner as described in Example 18, and the battery test was carried out in the same manner as described in Example 18.

The charging-discharging operation could be repeated 877 times before the charging-discharging efficiency was reduced to 70%. At the 5th cycle, the energy density was 143 W.hr/kg, and the maximum charging-discharging efficiency was 100%. When the battery was allowed to stand in the charged state for 70 hours, the self-discharge ratio was 2.4%.

We claim

1. A non-aqueous secondary battery comprising a positive electrode composed of a polymer of aniline or an aniline derivative and a negative electrode composed of (i) an alkali metal, (ii) an alkali metal alloy, (iii) an electroconductive polymer or (iv) an alkali metal or alkali metal alloy/electroconductive polymer composite, wherein the polymer of aniline or an aniline derivative is formed by converting a doped polymer obtained by oxidative polymerization to an undoped state, the conversion of the doped polymer to an undoped state being carried out by
   (i) a treatment with an aqueous solution of an alkali, or
   (ii) a heat treatment at 100 to 300 ° C.

2. A secondary battery as set forth in claim 1, wherein the polymer of aniline or an aniline derivative is a homopolymer of a compound represented by the following general formula (1) or (2) or a copolymer comprising at least 50 mole % of units derived from a compound represented by the following general formula (1) or (2):

(1)

or (2)

wherein R$_1$ through R$_6$ independently represent a hydrogen atom or an alkyl group or alkoxy group having 1 to 5 carbon atoms, and X and Y independently represent a hydrogen atom or a phenyl group.

3. A secondary battery as set forth in claim 1 wherein the doped polymer of aniline or an aniline derivative is obtained by subjecting aniline or an aniline derivative to electrochemical oxidative polymerization in a solvent capable of dissolving aniline or the aniline derivative therein at a current density of 0.01 to 50 mA/cm$^2$ and an electric field voltage of 1 to 300V in the presence of a complexing agent represented by the following general formula:

$$M^+ A^-$$

wherein M$^+$ is a cation selected from the group consisting of a proton, a quaternary ammonium cation, a lithium cation, a sodium cation and a potassium cation and A$^-$ is an anion selected from the group consisting of BF$_4^-$, AsF$_4^-$, AsF$_6^-$, SbF$_6^-$, SbCl$_6^-$, PF$_6^-$, ClO$_4^-$, HSO$_4^-$, SO$_4^{2-}$, Cl$^-$, Br$^-$, and F$^-$.

4. A secondary battery as set forth in claim 1, wherein the polymer of aniline or an aniline derivative is obtained by subjecting aniline or an aniline derivative to chemical oxidative polymerization in the presence of a strong acid exerting an oxidative action in the water-dissolved state or in the presence of a strong acid and an oxidant.

5. A secondary battery as set forth in claim 1, wherein the alkali is selected from the group consisting of alkali metal hydroxides, alkaline earth metal hydroxides, ammonia and amines.

6. A secondary battery as set forth in claim 1, wherein the heat treatment is carried out in an inert gas or in vacuum.

7. A secondary battery as set forth in claim 1, wherein the polymer of aniline or an aniline derivative is one prepared by converting a doped polymer obtained by oxidative polymerization to an undoped state and then complexing the undoped polymer with a protonic acid.

8. A secondary battery as set forth in claim 7, wherein the polymer converted to an undoped state is washed with an electrolytic solution used for formation of the secondary battery or is washed or extracted with an organic solvent to remove soluble components, before or after complexing with the protonic acid.

9. A secondary battery as set forth in claim 7, wherein the complexing is accomplished by immersing the polymer in an aqueous solution of a protonic acid containing an anion selected from the group consisting of a halogen anion, an anion of a halide of an element of the Group IIIa of the Periodic Table, an anion of a halide of an element of the Group Va of the Periodic Table, $ClO_4^-$, $HSO_4^-$ and $SO_2^{2-}$, which has a pH value not larger than 3.

10. A secondary battery as set forth in claim 1, wherein a supporting electrolyte of an electrolytic solution of the secondary battery is an alkali metal salt.

* * * * *